United States Patent [19]

Kupfert et al.

[11] 3,895,814

[45] July 22, 1975

[54] ROTARY SHAFT SEAL

[75] Inventors: Bernard F. Kupfert, Peoria, Ill.;
Gerald J. Bailey, Lexington, Ky.

[73] Assignee: Parker-Hannifin Corporation,
Cleveland, Ohio

[22] Filed: Oct. 3, 1973

[21] Appl. No.: 403,049

Related U.S. Application Data

[63] Continuation of Ser. No. 170,426, Aug. 10, 1971.

[52] U.S. Cl. ............................................... 277/134
[51] Int. Cl.² ......................................... F16J 15/40
[58] Field of Search ..................... 277/134, 96, 133

[56]        References Cited
         UNITED STATES PATENTS

| 3,214,179 | 10/1965 | Dega | 277/134 |
| 3,504,920 | 4/1970 | Halliday | 277/134 |
| 3,572,730 | 3/1971 | Otto et al. | 277/96 |
| 3,586,342 | 6/1971 | Staab | 277/134 |
| 3,633,927 | 1/1972 | Van Deven | 277/134 |

FOREIGN PATENTS OR APPLICATIONS

| 1,196,451 | 6/1970 | United Kingdom | 277/134 |
| 1,219,569 | 1/1971 | United Kingdom | 277/134 |

OTHER PUBLICATIONS

Proceedings of Seal Symposium, Research Publication GMR-532, Sept. 30, 1965, GMC, Warren, Michigan, pp. 51.

*Primary Examiner*—Robert I. Smith
*Attorney, Agent, or Firm*—John N. Wolfram

[57]            ABSTRACT

A shaft seal having converging frusto-conical faces defining an annular sealing edge for contacting a rotatable shaft. Because the edge may not be initially perfectly formed and may permit slight leakage until it wears itself into a perfect fit with the shaft, the frusto-conical face on the atmospheric side of the edge has thereon a circumferential series of projecting portions that function as pumping elements to pump oil leaking from the oil side past the sealing edge back to the oil side. The raised portions are minuscule in size so that they will wear away and disappear during a fraction of the useful life of the seal when the sealing edge has worn itself into a leakproof fit on the shaft to thus eliminate at a predetermined wear in point the pumping action because such pumping action tends to carry dirt from the atmospheric side to the oil side.

4 Claims, 8 Drawing Figures

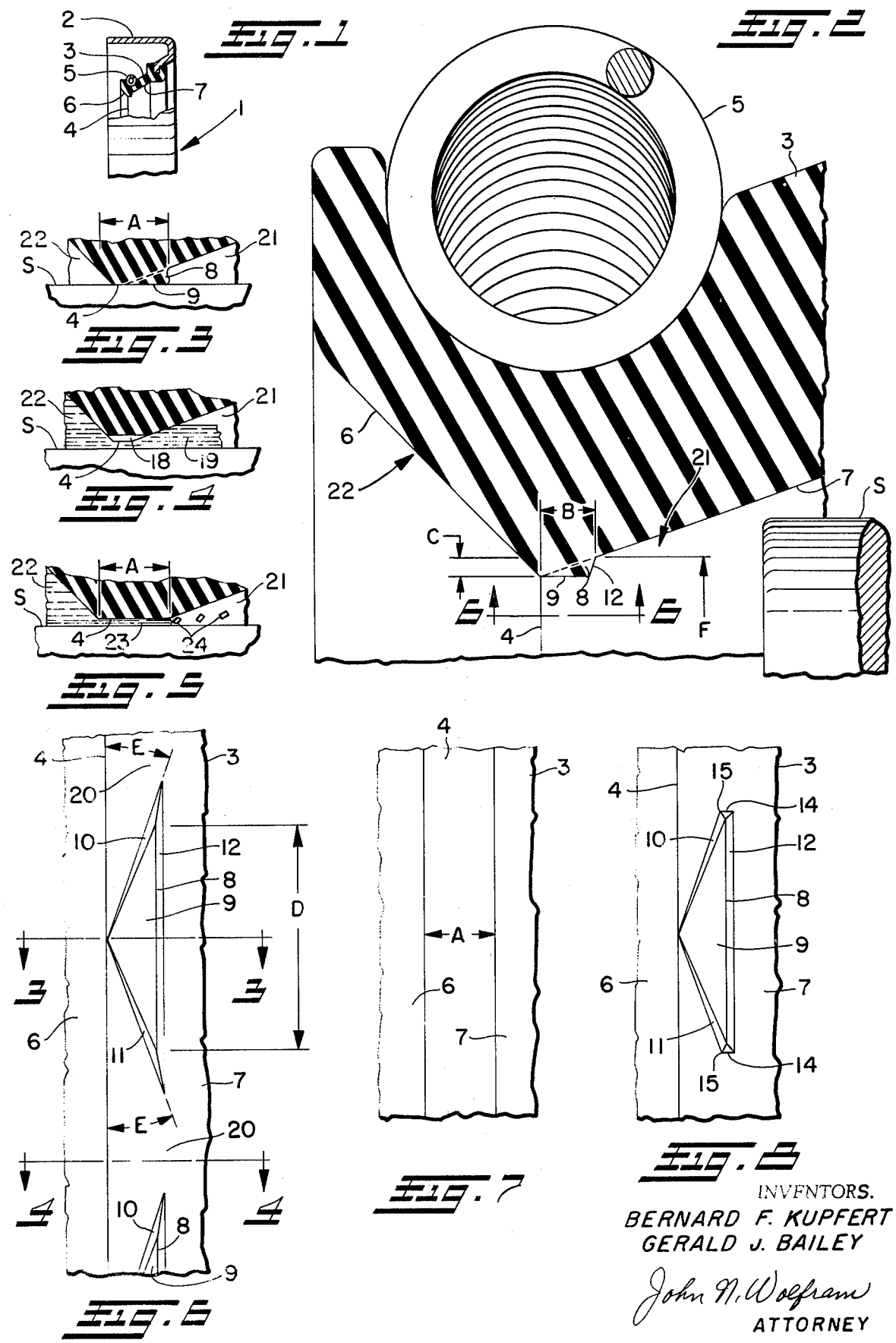

ROTARY SHAFT SEAL

This is a continuation of application Ser. No. 170,426 filed Aug. 10, 1971.

BACKGROUND OF THE INVENTION

As known, when rotary shaft seals are molded of elastomeric materials it is very difficult to mold a sharp annular sealing edge sufficiently flawless so that it will make perfect sealing engagement around the shaft and therefore pumping elements have been provided on the oil side of the sealing edge to pump oil leaking past the edge back to the oil side as the shaft rotates. If dust or dirt is present on the atmospheric side, small particles of the same may contact and become entrained in the leakage oil and be carried thereby to the oil side of the pumping action. As the shaft rotates, the imperfections on the sealing edge gradually wear off and the edge soon makes leakproof contact around the shaft and when this occurs the pumping action is not required. However, in prior arrangements, the pumping action contines.

When the sealing edge has worn into leakproof contact with the shaft it will be in the form of a narrow surface. Even though leakage as such has stopped, there will be a very thin film of oil between the shaft and the adjacent surfaces of the sealing edge and pumping elements, as well as on the shaft circumferentially between the pumping elements. If, in the prior arrangements, any dirt particles on the atmospheric side contact this oil film, the pumping elements will cause the dirt to be pumped to the oil side, which of course can be detrimental to the moving parts being lubricated by the oil.

SUMMARY OF THE INVENTION

In the shaft seal of the present invention, the pumping elements are minuscule in both axial and radial dimensions so that they will perform their pumping function only as long as needed, that is, until the imperfections of the molded sealing edge are worn away and the edge is in leakproof engagement with the shaft. Accordingly, the pumping elements disappear when no longer needed and there is no subsequent pumping of dirt into the oil side of the seal.

BRIEF DESCRIPTION OF THE DRAWING

FIG. 1 is a fragmentary side elevation, partly in cross section, of an oil seal embodying the invention;

FIG. 2 is a much enlarged cross axial section through one of the pumping elements;

FIG. 3 is a less enlarged fragmentary cross section on the lines 3—3 of FIG. 6 with the seal on the shaft and no oil present;

FIG. 4 is a fragmentary cross section view on the lines 4—4 of FIG. 6 showing an imperfection in the molded edge and with oil present;

FIG. 5 is a view like FIG. 3 after the pumping elements have been worn away;

FIG. 6 is a fragmentary view on the lines 6—6 of FIG. 2;

FIG. 7 is a view like FIG. 6 after the pumping elements have been worn away; and FIG. 8 is a view like FIG. 6 except illustrating a modification.

DETAILED DESCRIPTION OF THE INVENTION

The shaft seal 1 comprises a metal case 2 having bonded thereto an elastomeric sealing element 3 providing an annular sealing edge 4 which is spring loaded as by means of a garter spring 5 to make sealing contact with a rotating shaft S. Edge 4 is the line of convergence of frusto-conical faces 6 and 7. It is molded as sharp as possible, although for practical reasons it may be initially rounded with a small radius of about 0.002 inches, or it may be in the form of a small flat. In any of these cases, it is very difficult to mold edge 4 completely flawless and minute imperfections therein incident to the molding operation, such as a tiny slot as illustrated at 18 in FIG. 4, may permit leakage of oil from oil side 22 to the atmospheric side 21 of edge 4.

Accordingly, frusto-conical face 7, on the atmospheric side of edge 4 is provided with a series of circumferentially spaced minuscule projections 8 of generally triangular form when viewed radially outward, as in FIG. 6. The radially inner surfaces 9 of these triangles lie in a cylinder that is preferably of a diameter initially equal to the diameter of sealing edge 4, as shown in FIG. 2, and the maximum diameter F of the junctions of the projections 8 with frusto-conical face 7 is preferably initially less than the diameter of shaft S. When the seal is mounted on shaft S, edge 4 will be slightly expanded in diameter so that it and the plurality of triangular projections 8 will resiliently contact shaft S with edge 4 being somewhat flattened against the shaft, as shown in FIG. 3.

The sides 10, 11 of each projecting triangle 8 make an acute angle E with the plane containing edge 4, such plane being normal to the longitudinal axis of the shaft seal 1. Angle E is preferably in the neighborhood of 20°. When shaft S rotates in one direction sides 10 will function as pumping elements and when the shaft rotates in the other direction sides 11 will function as the pumping elements.

When the seal is first assembled in a dry state to a dry shaft, edge 4 and faces 9 will be in direct contact with the shaft as shown in FIG. 3. However, when in service to seal oil contained in oil side 22, a thin film of oil will develop between the shaft and edge 4 and faces 9, as well as on the shaft in the spaces 20 between adjacent raised portions 8. This very thin film in itself does not result in leakage but there will be leakage through imperfections in edge 4 as represented by small slot 18 in FIG. 4. Such leakage fluid, indicated at 19 in FIG. 4, will be contacted by sides 10 or 11 of projecting triangles 8, depending upon the direction of rotation of the shaft, and will be pumped thereby past edge 4 into oil side 22 of the seal.

In the present invention projecting triangles 8 are minuscule, as for example, about 0.015 inch in axial length B, about 0.004 inches in radial depth C at base 12, and about 0.050 inches in circumferential width D. For many applications about five such triangles per circumferential inch of edge 4 for a shaft of about 3 inches in diameter will suffice.

As edge 4 progressively wears to widen its contact against shaft S the triangular projections 8 will become shorter and shorter in axial length and completely disappear when edge 4 has worn to the length A as illustrated in FIGS. 3, 5 and 7.

At that time, sealing edge 4, which is now more properly called a surface, is now devoid of imperfections that would permit leakage and there is only a very thin film of oil, as at 23 in FIG. 5, between surface 4 and shaft S. Because pumping elements 10, 11 are no longer present, any dirt particles 24 on atmospheric side 21 that contact the outer edge of oil film 23 will not be pumped to oil side 22.

According to the present invention, the projecting triangles 8 are made so small that they will wear away about the same time, or shortly after, the wearing away of the imperfections in sealing edge 4 and this will all occur within a small fraction of the useful life of the seal so that no pumping of dirt will occur during the greater part of the useful life. For the projections to wear away about the same time, or shortly after the imperfections are worn away, the largest diameter F across the projections needs to be only about the same as, or slightly larger, than the largest diameter across the imperfections 18. As shown in FIG. 2, such a diameter F, when the seal is not on the shaft, is smaller than the shaft diameter.

The form of invention shown in FIG. 8 is the same as in the other figures except that sides 10, 11 and base 12 of the projecting triangles 8 have been shortened as at 17 thus to do away with the pumping function of the sides 10, 11 at an earlier stage of wearing in. Thus, when the sealing edge 4 has worn to about the points 15, the remaining portions 14 no longer function as pumping elements.

Sides 10, 11 and base 12 may be slightly tapered relative to face 7, as shown, that is, at an obtuse angle to face 7, to thereby facilitate making of the molding dies and stripping of the sealing element 3 therefrom.

Although it is preferred to have the maximum diameter of the projecting triangles 8 initially less than the diameter of shaft S, such diameter may be initially the same or slightly greater than the shaft diameter when a coil spring 5 of sufficient tension is employed to compress the sealing edge 4 against the shaft even after the projecting triangles 8 have been worn away.

We, therefore, particularly point out and distinctly claim as our invention:

1. In combination, a seal and a rotatable shaft of predetermined diameter, said seal comprising a ring of elastomeric material having converging faces meetings at a circumferentially continuous circular edge that is in contact with said shaft about the circumference thereof and which edge may have a minor imperfection that permits leakage of fluid along said shaft from one side of said edge to the other, the face that is on said other side of the edge having thereon a single circumferential series of radially inwardly projecting portions whose largest radial height is about 0.004 inch, each projection having at least one side that converges toward said edge and which constitutes a pumping element that is operative during rotation of the shaft when the seal is mounted thereon and pumps said leakage fluid from said other side of said edge back to said one side; the largest diameter across said projecting portions when the seal is not on the shaft being substantially as large as the largest diameter across said imperfection but smaller than said pre-determined diameter, said elastomeric material being wearable by the rotating shaft whereby said imperfect edge will be worn away followed by a complete wearing away of the projecting portions, such wearing away of the edge and projecting portions resulting in a flat, smooth cylindrical surface of substantially uniformed axial length whose diameter when the projecting portions have just worn away and the seal is removed from the shaft is smaller than the diameter of the shaft.

2. The seal of claim 1 in which the the projected circumferential length of said one side of said projecting portions is no more than about 0.025 inch and the angle of said convergence with said edge is about 20°.

3. The seal of claim 1 in which there is a spring encircling said edge and said cylindrical surface has an axial length that is less than one-fourth the axial length of said spring and the axial centerpoint of said spring is substantially radially opposite said edge prior to said wear thereof and substantially opposite the axial centerpoint of said cylindrical surface after said projecting portions have just worn away.

4. The seal of claim 1 wherein said projecting portions are in the form of generally triangular prisms each having two side surfaces which converge toward said edge to form said pumping elements and a third side surface which is axially spaced from said edge; the radially inner faces of said prisms being cylindrical and of substantially the same diameter as said edge so as to have a substantially triangular contact area with said shaft when said ring is radially expanded around the shaft, and said radially inner faces of said prisms having an axial length of about 0.015 inch.

* * * * *